US009163692B2

(12) United States Patent
Kojima et al.

(10) Patent No.: US 9,163,692 B2
(45) Date of Patent: Oct. 20, 2015

(54) ROTARY DAMPER

(71) Applicant: OILES CORPORATION, Tokyo (JP)

(72) Inventors: Masamitsu Kojima, Ashikaga (JP);
Akihiko Okimura, Ashikaga (JP);
Yoshiteru Igarashi, Ashikaga (JP);
Naohiro Horita, Ashikaga (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 14/027,881

(22) Filed: Sep. 16, 2013

(65) Prior Publication Data

US 2014/0014449 A1 Jan. 16, 2014

Related U.S. Application Data

(62) Division of application No. 13/129,655, filed as application No. PCT/JP2009/006206 on Nov. 18, 2009, now Pat. No. 8,757,337.

(30) Foreign Application Priority Data

Nov. 20, 2008 (JP) .................................. 2008-297376
Mar. 13, 2009 (JP) .................................. 2009-062102

(51) Int. Cl.
*F16F 9/44* (2006.01)
*F16F 9/14* (2006.01)

(52) U.S. Cl.
CPC .. *F16F 9/44* (2013.01); *F16F 9/145* (2013.01)

(58) Field of Classification Search
CPC ..................................... F16F 9/145; F16F 9/44
USPC .......................... 188/290, 306, 307; 16/82, 51

See application file for complete search history.

(56) References Cited

U.S. PATENT DOCUMENTS

| 1,556,790 | A | * | 10/1925 | Helfinstine | 188/307 |
|---|---|---|---|---|---|
| 4,768,630 | A | * | 9/1988 | Aubry et al. | 188/290 |
| 5,355,979 | A | * | 10/1994 | Stephan et al. | 188/290 |
| 5,392,884 | A | * | 2/1995 | Ojima | 188/293 |
| 5,449,054 | A | * | 9/1995 | Wiese et al. | 188/296 |
| 6,314,612 | B1 | * | 11/2001 | Rennecke et al. | 16/54 |
| 6,687,921 | B1 | * | 2/2004 | Li | 4/236 |
| 2005/0072639 | A1 | * | 4/2005 | Orita | 188/307 |
| 2005/0139691 | A1 | * | 6/2005 | Seto et al. | 237/56 |
| 2011/0226573 | A1 | | 9/2011 | Kojima et al. | |

FOREIGN PATENT DOCUMENTS

JP  6-294430 A  10/1994
JP  8-109940 A  4/1996

(Continued)

OTHER PUBLICATIONS

International Search Report for PCT/JP2009/006206, mailed Jan. 19, 2010.

*Primary Examiner* — Bradley King
(74) *Attorney, Agent, or Firm* — Nixon & Vanderhye P.C.

(57) ABSTRACT

A rotary damper 1 includes a synthetic resin-made accommodating case 4 for accommodating in its interior 2 a viscous fluid 3 which is constituted by silicone oil or the like and whose viscosity declines with a temperature rise, and a synthetic resin-made rotor 9 which is disposed in the interior 2 of the accommodating case 4 rotatably, i.e., so as to be rotatable in R1 and R2 directions about an axis O, and which partitions the interior 2 of the accommodating case 4 into at least two chambers, i.e., in this embodiment, two chambers consisting of chambers 5 and 6 and two chambers consisting of chambers 7 and 8, in cooperation with the accommodating case 4.

4 Claims, 9 Drawing Sheets

(56) References Cited

FOREIGN PATENT DOCUMENTS

| JP | 08-296687 | | 11/1996 |
|---|---|---|---|
| JP | 09-042350 | | 2/1997 |
| JP | 9-329173 | A | 12/1997 |
| JP | 11-223234 | A | 8/1999 |
| JP | 2005-188636 | A | 7/2005 |

* cited by examiner

ROTARY DAMPER

This application is a divisional of U.S. patent application Ser. No. 13/129,655, filed 17 May 2011, which is the U.S. national phase of International Application No. PCT/JP2009/006206, filed 18 Nov. 2009, which designated the U.S. and claims priority to Japan Application No. 2008-297376, filed 20 Nov. 2008; and Japan Application No. 2009-062102, filed 13 Mar. 2009, the entire contents of each of which are hereby incorporated by reference.

TECHNICAL FIELD

The present invention relates to a rotary damper in which a rotor having vanes is rotatably accommodated in the interior of an accommodating case for accommodating a viscous fluid, and braking is imparted by the viscous fluid to the relative rotation of the rotor with respect to the accommodating case.

BACKGROUND ART

Unidirectional rotary dampers of this type in which large braking is imparted to the rotation of the rotor in one direction by a viscous fluid which passes through clearances and small braking is imparted to the rotation of the rotor in the other direction are known from Patent Document 1 and the like.

PRIOR ART DOCUMENTS

Patent Documents

Patent Document 1: JP-A-2005-188636
Patent Document 2: JP-A-9-42350
Patent Document 3: JP-A-9-329173
Patent Document 4: JP-A-8-109940
Patent Document 5: JP-A-8-296687

SUMMARY OF THE INVENTION

Problems that the Invention is to Solve

With such a rotary damper, since the viscosity of the viscous fluid changes depending on the temperature, braking decreases in use under high temperature, while braking increases in use under low temperature. Therefore, the use of the rotary damper of this type is not suitable in the case of equipment for which braking that does not change even at high temperature or low temperature is required, such as a vehicle seat for an automobile or the like which has a foldable backrest portion and which is not subjected to constant temperature control at an installation site such as outdoors.

The present invention has been devised in view of the above-described aspects, and its object is to provide a rotary damper which is suitable for use in a vehicle seat for an automobile or the like, in which braking that is generated is free of temperature dependence, and which makes it possible to obtain braking which does not change even at high temperature or low temperature.

Means for Solving the Problems

A rotary damper in accordance with the present invention comprises: an accommodating case for accommodating in its interior a viscous fluid whose viscosity declines with a temperature rise and a rotor which is disposed rotatably in the interior of the accommodating case and which partitions the interior of the accommodating case into at least two chambers in cooperation with the accommodating case, wherein the rotor has a rotor body which is rotatably supported in the accommodating case and an elastic vane which is provided on an outer peripheral surface of the rotor body, wherein the elastic vane includes a curved projecting surface which is continuously connected at one end to the outer peripheral surface of the rotor body and opposes at another end an inner peripheral surface of the accommodating case, and which forms one of the two chambers in cooperation with the inner peripheral surface of the accommodating case, and a curved recessed surface which is continuously connected at one end to the outer peripheral surface of the rotor body in correspondence with the projecting surface and extends along the projecting surface, and which forms the other one of the two chambers in cooperation with the inner peripheral surface of the accommodating case, and wherein the projecting surface has on its other end side a circular arc-shaped projecting surface which forms between the same and the inner peripheral surface of the accommodating case a pair of wedge spaces opposing each other in a circumferential direction, the circular arc-shaped projecting surface determines a radial width of one wedge space communicating with one of the two chambers such that the radial width of the one wedge space becomes gradually narrow toward another one of the wedge spaces in the circumferential direction, and the circular arc-shaped projecting surface determines a radial width of the other wedge space communicating with another one of the two chambers such that the radial width of the other wedge space becomes gradually narrow toward the one wedge space in the circumferential direction, and wherein the viscous fluid passing through the pair of wedge spaces is adapted to determine the radial width of the pair of wedge spaces by means of its viscosity by elastically deflecting the elastic vane.

According to the rotary damper in accordance with the present invention, when the rotor is rotated with respect to the accommodating case so as to reduce one chamber and enlarge the other chamber, the pressure of the viscous fluid is imparted to the curved projecting surface of the elastic vane, so that the elastic vane is elastically deformed such that the other end side of the elastic vane moves away from the inner peripheral surface of the accommodating case to widen the pair of wedge spaces. As a result, the viscous fluid passes through the pair of widened wedge spaces and flows from the one chamber into the other chamber, thereby imparting to the rotation of the rotor small braking due to the viscous fluid passing through the pair of widened wedge spaces. Meanwhile, when the rotor is rotated with respect to the accommodating case so as to enlarge the one chamber and reduce the other chamber, the pressure of the viscous fluid is imparted to the recessed surface of the elastic vane, so that the elastic vane is elastically deformed such that the other end side of the elastic vane approaches the inner peripheral surface of the accommodating case to narrow the pair of wedge spaces. As a result, the viscous fluid passes through the pair of narrowed wedge spaces and flows from the other chamber into the one chamber, thereby imparting to the rotation of the rotor large braking due to the viscous fluid passing through the pair of narrowed wedge spaces. Thus, the rotary damper is adapted to function as a unidirectional damper.

In addition, according to the rotary damper in accordance with the present invention, the viscous fluid whose viscosity declines with a temperature rise passes through the pair of wedge spaces in the rotation of the rotor. Therefore, in a case where, for example, the viscous fluid whose viscosity at low temperature has increased more than at normal temperature (20° C.) passes through the pair of wedge spaces, the elastic vane is caused to undergo elastic deformation such that the other end side of the elastic vane moves away from the inner peripheral surface of the accommodating case owing to the increased pressure of the viscous fluid at the pair of wedge spaces, so that the pair of wedge spaces are widened. As a result, by virtue of the increased viscosity of the viscous fluid itself and a decline in the flow resistance based on the widening of the pair of wedge spaces, it is possible to maintain the braking persisting during normal temperature despite the low temperature. Meanwhile, in a case where the viscous fluid whose viscosity at high temperature has decreased more than at normal temperature passes through the pair of wedge spaces, the elastic vane is caused to undergo elastic deformation such that the other end side of the elastic vane approaches the inner peripheral surface of the accommodating case owing to the decreased pressure of the viscous fluid at the pair of wedge spaces, so that the pair of wedge spaces are narrowed. As a result, by virtue of the decreased viscosity of the viscous fluid itself and an increase in the flow resistance based on the narrowing of the pair of wedge spaces, it becomes possible to maintain the braking persisting during normal temperature despite the high temperature. Hence, the braking which is generated is free of temperature dependence, and it is possible to obtain braking which does not change even at high temperature or low temperature.

In a preferred example of this rotary damper, the inner peripheral surface of the accommodating case includes a cylindrical inner peripheral surface which forms the one wedge space in cooperation with the circular arc-shaped projecting surface and a curved recessed inner peripheral surface which is continuously connected to the cylindrical inner peripheral surface and has a complementary shape to the projecting surface, and the circular arc-shaped projecting surface has a smaller radius of curvature than a radius of curvature of the cylindrical inner peripheral surface.

In addition, a rotary damper in accordance with the present invention comprises: an accommodating case having a cylindrical inner peripheral surface; a rotor disposed in an interior of the accommodating case relatively rotatably with respect to the accommodating case so as to form a space for accommodating between the cylindrical inner peripheral surface of the accommodating case and a cylindrical outer peripheral surface concentric with that inner peripheral surface a viscous fluid whose viscosity declines with a temperature rise; and vane means disposed in the space accommodating the viscous fluid between the cylindrical inner peripheral surface of the accommodating case and the cylindrical outer peripheral surface of the rotor so as to cause large flow resistance to be generated in the viscous fluid in the relative rotation in one direction of the rotor with respect to the accommodating case and so as to cause smaller flow resistance than that flow resistance to be generated therein in the relative rotation in another direction opposite to the relative rotation in the one direction of the rotor with respect to the accommodating case, wherein the vane means has a pair of elastic vanes for partitioning into two chambers the space accommodating the viscous fluid between the cylindrical inner peripheral surface of the accommodating case and the cylindrical outer peripheral surface of the rotor and another elastic vane for further partitioning into two chambers at least one of the two chambers partitioned by the pair of elastic vanes, wherein each of the pair of elastic vanes includes a curved projecting surface which is continuously connected at its one end portion to the outer peripheral surface of the rotor and which is projecting in an opposite direction to the relative rotation in the one direction of the rotor with respect to the accommodating case, and a curved recessed surface which is continuously connected at its one end portion to the outer peripheral surface of the rotor in correspondence with the projecting surface, and which extends along the projecting surface, and wherein the projecting surface has on its other end portion side a circular arc-shaped projecting surface which forms between the same and the inner peripheral surface of the accommodating case a pair of wedge spaces opposing each other in a rotational direction of the relative rotation of the rotor with respect to the accommodating case, the circular arc-shaped projecting surface determines a radial width of one of the wedge spaces communicating with one of the two chambers adjacent to each other with the circular arc-shaped projecting surface therebetween in the rotational direction of the relative rotation of the rotor with respect to the accommodating case, such that the radial width of the one wedge space becomes gradually narrow toward another one of the wedge spaces communicating with another one of the chambers adjacent to each other with the circular arc-shaped projecting surface therebetween in the rotational direction of the relative rotation of the rotor with respect to the accommodating case, and the circular arc-shaped projecting surface determines a radial width of the other wedge space communicating with the other one of the two chambers adjacent to each other with the circular arc-shaped projecting surface therebetween in the rotational direction of the relative rotation of the rotor with respect to the accommodating case, such that the radial width of the other wedge space becomes gradually narrow toward the one wedge space communicating with the one of the two chambers adjacent to each other with the circular arc-shaped projecting surface therebetween in the rotational direction of the relative rotation of the rotor with respect to the accommodating case, the viscous fluid passing through the pair of wedge spaces is adapted to determine the radial width of the pair of wedge spaces by means of its viscosity by elastically deflecting each of the pair of elastic vanes.

With the above-described rotary damper as well, when the rotor is rotated with respect to the accommodating case so as to enlarge one chamber located on the relative rotation side in the other opposite direction to the relative rotation in the one direction of the rotor with respect to the accommodating case and reduce the other chamber on the relative rotation side in the one direction of the rotor with respect to the accommodating case between the two chambers which are partitioned by the respective pair of elastic vanes and are adjacent to each other in the rotational direction of the relative rotation of the rotor with respect to the accommodating case, the pressure of the viscous fluid is imparted to the respective recessed surfaces of the pair of elastic vanes. Therefore, each of the pair of elastic vanes is elastically deformed such that the other end side of each of the pair of elastic vanes approaches the inner peripheral surface of the accommodating case to narrow the pair of wedge spaces. As a result, the viscous fluid passes through the pair of narrowed wedge spaces and flows from the other chamber into the one chamber, thereby imparting to the rotation of the rotor large braking due to the viscous fluid passing through the pair of narrowed wedge spaces. Meanwhile, when the rotor is rotated with respect to the accommodating case so as to reduce the one chamber and enlarge the other chamber, the pressure of the viscous fluid is imparted to the respective curved projecting surfaces of the pair of elastic vanes. Therefore, each of the pair of elastic vanes is elastically deformed such that the other end side of each of the pair of elastic vanes moves away from the inner peripheral surface of the accommodating case to widen the pair of wedge spaces. As a result, the viscous fluid passes through the pair of widened wedge spaces and flows from the one chamber into the other chamber, thereby imparting to the rotation of the rotor small braking due to the viscous fluid passing through the pair of widened wedge spaces. Thus, the rotary damper is adapted to function as a unidirectional damper.

In addition, according to the rotary damper, the viscous fluid whose viscosity declines with a temperature rise passes through the pair of wedge spaces in the rotation of the rotor. Therefore, in a case where, for example, the viscous fluid whose viscosity at low temperature has increased more than at normal temperature (20° C.) passes through the pair of wedge spaces, each of the pair of elastic vanes is caused to undergo elastic deformation such that the other end side of each of the pair of elastic vanes moves away from the inner peripheral surface of the accommodating case owing to the increased pressure of the viscous fluid at the pair of wedge spaces, so that the pair of wedge spaces are widened. As a result, by virtue of the increased viscosity of the viscous fluid itself and a decline in the flow resistance based on the widening of the pair of wedge spaces, it is possible to maintain the braking persisting during normal temperature despite the low temperature. Meanwhile, in a case where the viscous fluid whose viscosity at high temperature has decreased more than at normal temperature passes through the pair of wedge spaces, each of the pair of elastic vanes is caused to undergo elastic deformation such that the other end side of each of the pair of elastic vanes approaches the inner peripheral surface of the accommodating case owing to the decreased pressure of the viscous fluid at the pair of wedge spaces, so that the pair of wedge spaces are narrowed. As a result, by virtue of the decreased viscosity of the viscous fluid itself and an increase in the flow resistance based on the narrowing of the pair of wedge spaces, it becomes possible to maintain the braking persisting during normal temperature despite the high temperature. Hence, the braking which is generated is free of temperature dependence, and it is possible to obtain braking which does not change even at high temperature or low temperature.

In another preferred example of this rotary damper, the circular arc-shaped projecting surface has a smaller radius of curvature than a radius of curvature of the inner peripheral surface of the accommodating case.

In addition, in still another preferred example of the above-described rotary damper, the other elastic vane includes a proximal portion which is integrally formed on the inner peripheral surface of the accommodating case and an elastically flexible tongue portion which is integrally formed on the proximal portion and has a circular arc-shaped surface opposing the outer peripheral surface of the rotor.

In each of the above-described other elastic vanes, the tongue portion may have a circular arc-shaped recessed surface which forms between the same and the outer peripheral surface of the rotor a pair of wedge spaces opposing each other in a rotational direction of the relative rotation of the rotor with respect to the accommodating case. This circular arc-shaped recessed surface determines the radial width of one of the wedge spaces communicating with one of the two chambers adjacent to each other with that circular arc-shaped recessed surface therebetween in the rotational direction of the relative rotation of the rotor with respect to the accommodating case, such that the radial width of the one wedge space becomes gradually narrow toward the other wedge space communicating with the other one of the adjacent two chambers. This circular arc-shaped recessed surface also determines the radial width of the other wedge space communicating with the other one of the adjacent two chambers, such that the radial width of the other wedge space becomes gradually narrow toward the one wedge space communicating with the one of the adjacent two chambers. Thus, the viscous fluid passing through the pair of wedge spaces may be adapted to determine the radial width of the pair of wedge spaces by means of its viscosity by elastically deflecting each of the other elastic vanes.

According to any one of the above-described rotary dampers, in a further preferred example, the recessed surface extends along the projecting surface so as to gradually approach the projecting surface from the one end portion to the other end portion of the projecting surface.

In the present invention, as the viscous fluid, it is possible to cite silicone oil as a preferable example, but another viscous fluid may be used. In addition, the accommodating case may be made of a metal, but may be made of a hard synthetic resin for such reasons as weight saving, cost reduction, and the like. Also, the rotor may be made of a metal, but may be made of a hard synthetic resin for such reasons as weight saving, cost reduction, and the like. The elastic vane may be formed separately from the rotor body and may be secured to the rotor body by means of welding, fitting, bonding, or the like. Preferably, however, the elastic vane is integrally formed on the rotor body. In the case where the rotor body and the elastic vane are integrally formed, as the rotor it is preferable to use a synthetic resin material which imparts appropriate elasticity to the elastic vane. The pair of elastic vanes may also be formed separately from the rotor and may be secured to the rotor by means of welding, fitting, bonding, or the like. Preferably, however, the pair of elastic vanes are integrally formed on the rotor. In the case where the rotor and the pair of elastic vanes are integrally formed, as the rotor it is preferable to use a synthetic resin material which imparts appropriate elasticity to each of the pair of elastic vanes. In addition, the other elastic vanes may also be formed separately from the accommodating case and may be secured to the accommodating case by means of welding, fitting, bonding, or the like. Preferably, however, the other elastic vanes are integrally formed on the accommodating case. In the case where the accommodating case and the other elastic vanes are integrally formed, as the accommodating case it is preferable to use a synthetic resin material which imparts appropriate elasticity to each of the other elastic vanes.

Advantages of the Invention

According to the present invention, it is possible to provide a rotary damper which is suitable for use in a vehicle seat for an automobile or the like, in which braking that is generated is free of temperature dependence, and which makes it possible to obtain braking which does not change even at high temperature or low temperature.

MODE FOR CARRYING OUT THE INVENTION

Figure 1:
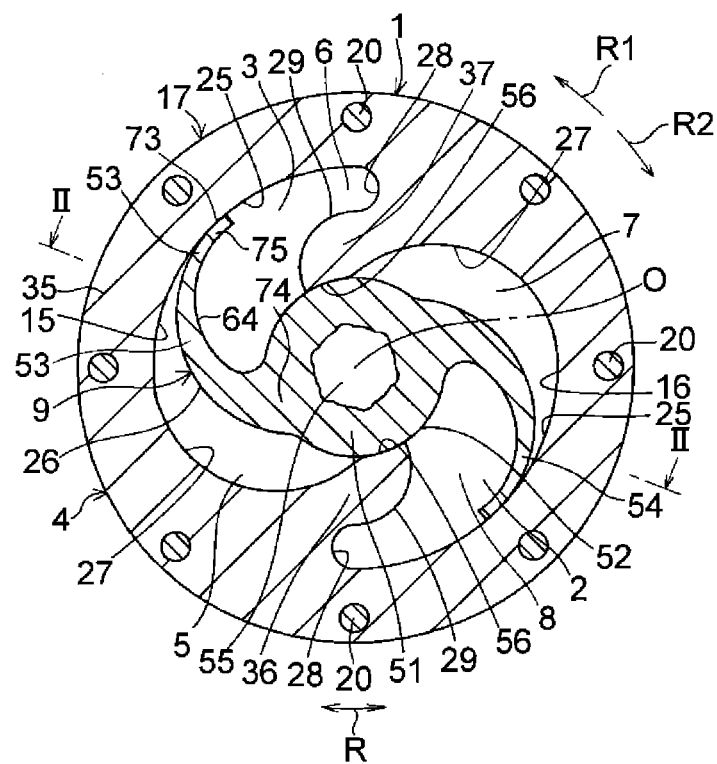
FIG. 1 is an explanatory cross-sectional view, taken in the direction of arrows along line I-I shown in FIG. 2, of a preferred embodiment of the present invention.
Figure 2:
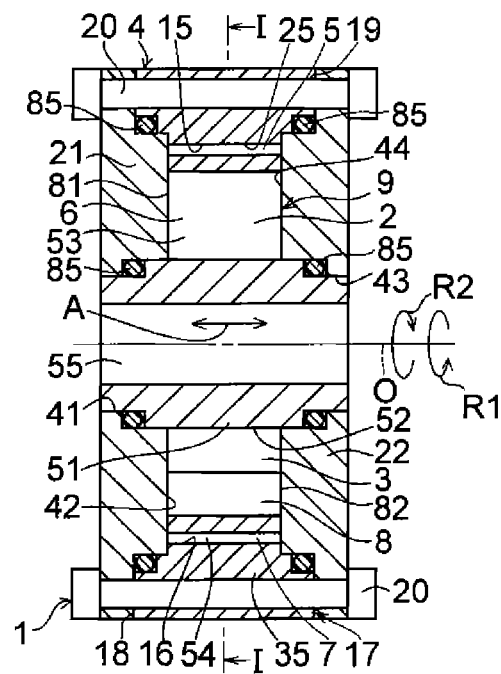
FIG. 2 is an explanatory cross-sectional view, taken in the direction of arrows along line II-II, of the preferred embodiment shown in FIG. 1.
Figure 3:
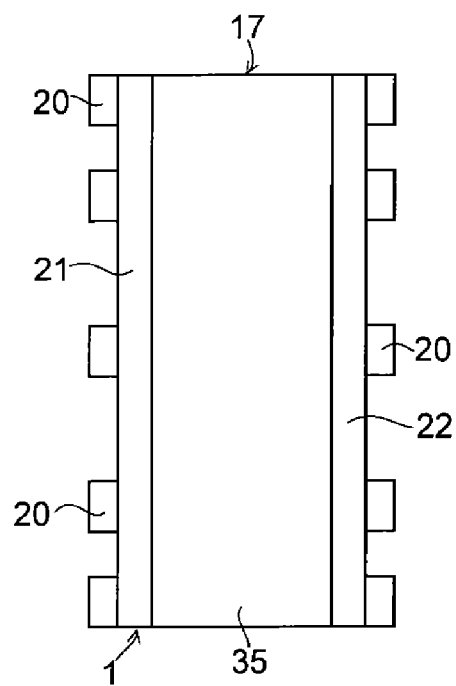
FIG. 3 is an explanatory external view of the embodiment shown in FIG. 1.
Figure 4:
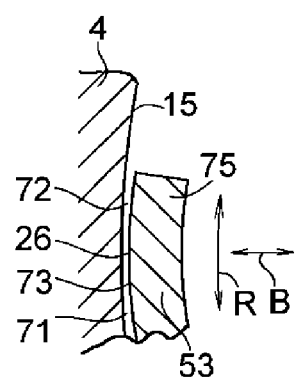
FIG. 4 is a partially enlarged explanatory view of the embodiment shown in FIG. 1.

Next, a more detailed description will be given of a mode for carrying out the invention with reference to the preferred embodiments illustrated in the drawings. It should be noted that the invention is not limited to these embodiments.

In FIGS. 1 to 4, a rotary damper 1 in accordance with this embodiment is comprised of a synthetic resin-made accommodating case 4 for accommodating in its interior 2 a viscous fluid 3 which is constituted by silicone oil or the like and whose viscosity declines with a temperature rise, as well as a synthetic resin-made rotor 9 which is disposed in the interior 2 of the accommodating case 4 rotatably, i.e., so as to be rotatable in R1 and R2 directions about an axis O, and which partitions the interior 2 of the accommodating case 4 into at least two chambers, i.e., in this embodiment, two chambers consisting of chambers 5 and 6 and two chambers consisting of chambers 7 and 8, in cooperation with the accommodating case 4.

The accommodating case 4 is comprised of a cylinder 17 having inner peripheral surfaces 15 and 16 and of a pair of covers 21 and 22 which are respectively secured to one and the other annular end surfaces 18 and 19 in an axial direction A of the cylinder 17 by means of a plurality of screws 20.

Since the inner peripheral surfaces 15 and 16 are formed in a mutually similar manner with symmetrical shapes about the axis O, a description will be given hereafter of the inner peripheral surface 15. The inner peripheral surface 15 has a cylindrical inner peripheral surface 25 having the axis O as the center; a curved recessed inner peripheral surface 27 which is continuously connected to one end of the cylindrical inner peripheral surface 25 and has a complementary shape to a projecting surface 26 of the rotor 9; a cylindrical inner peripheral surface 28 which is continuously connected at one end to the other end of the cylindrical inner peripheral surface 25; and a cylindrical inner peripheral surface 29 which is continuously connected at one end to the other end of the cylindrical inner peripheral surface 28. Each of the cylindrical inner peripheral surface 25 and the cylindrical inner peripheral surface 28 is constituted by a recessed surface in the same way as the curved recessed inner peripheral surface 27, and the cylindrical inner peripheral surface 29 is constituted by a projecting surface.

The cylinder 17 includes a cylindrical body 35 having the cylindrical inner peripheral surface 25, as well as a pair of projections 36 and 37 which are integrally formed in a mutually similar manner with symmetrical shapes about the axis O. The projection 36 has the curved recessed inner peripheral surface 27 of the inner peripheral surface 15 as well as the cylindrical inner peripheral surface 28 and the cylindrical inner peripheral surface 29 of the inner peripheral surface 16. The projection 37 has the curved recessed inner peripheral surface 27 of the inner peripheral surface 16 as well as the cylindrical inner peripheral surface 28 and the cylindrical inner peripheral surface 29 of the inner peripheral surface 15.

The cover 21 having a through hole 41 in its center defines at its one side surface 42 in the axial direction A one side of the interior 2 in the axial direction A. The cover 22 having a through hole 43 in its center defines at its one side surface 44 in the axial direction A the other side of the interior 2 in the axial direction A.

The rotor 9 has a hollow rotor body 51 which is supported in the accommodating case 4 so as to be rotatable in the R1 and R2 directions, as well as a pair of elastic vanes 53 and 54 which are integrally provided on an outer peripheral surface 52 of the rotor body 51.

A rotating shaft is adapted to be fitted in a hollow portion 55 at a central portion of the cylindrical rotor body 51. As this rotating shaft rotates in the R1 and R2 directions, the rotor body 51 is adapted to be rotated in those directions, and an object to be dampened is connected to such a rotating shaft.

The outer peripheral surface 52 of the rotor body 51 is in contact with respective circular arc-shaped distal end surfaces 56 of the projections 36 and 37 slidably movably in the R1 and R2 directions. The two chambers consisting of the chambers 5 and 6 and the two chambers consisting of the chambers 7 and 8 are respectively separated from each other tightly by the contact between the outer peripheral surface 52 of the rotor body 51 and the respective circular arc-shaped distal end surfaces 56 of the projections 36 and 37.

Since the elastic vanes 53 and 54 are formed in a mutually similar manner with symmetrical shapes about the axis O, a description will be given hereafter of the elastic vane 53. The elastic vane 53 includes the curved projecting surface 26 which is continuously connected at one end to the outer peripheral surface 52 of the rotor body 51 and opposes at the other end the cylindrical inner peripheral surface 25 of the inner peripheral surface 15 of the accommodating case 4 in close proximity thereto, and which forms the one chamber 5 of the two chambers 5 and 6 in cooperation with the inner peripheral surface 15 of the accommodating case 4, as well as a curved recessed surface 64 which is continuously connected at one end to the outer peripheral surface 52 of the rotor body 51 in correspondence with the projecting surface 26 and extends along the projecting surface 26, and which forms the other chamber 6 of the two chambers 5 and 6 in cooperation with the inner peripheral surface 15 of the accommodating case 4.

The projecting surface 26 has on its other end side a circular arc-shaped projecting surface 73 which forms between the same and the cylindrical inner peripheral surface 25 of the accommodating case 4 a pair of wedge spaces 71 and 72 opposing each other in a circumferential direction R, and which has a smaller radius of curvature than the radius of curvature of the cylindrical inner peripheral surface 25. The circular arc-shaped projecting surface 73 determines the width in a radial direction B of the one wedge space 71 communicating with the chamber 5 such that the width in the radial direction B of the one wedge space 71 becomes gradually narrow toward the other wedge space 72 in the circumferential direction R. Also, the circular arc-shaped projecting surface 73 determines the width in the radial direction B of the other wedge space 72 communicating with the chamber 6 such that the width in the radial direction B of the other wedge space 72 becomes gradually narrow toward the one wedge space 71 in the circumferential direction R. Thus, the viscous fluid 3 passing through the pair of wedge spaces 71 and 72 is adapted to determine the width in the radial direction B of the pair of wedge spaces 71 and 72, which allow the chambers 5 and 6 to communicate with each other, by means of its viscosity by deflecting the elastic vane 53.

The recessed surface 64 extends along the projecting surface 26 so as to gradually approach the projecting surface 26 from the one end to the other end of the projecting surface 26, and terminates at a terminating end of the projecting surface 26. As a result, the elastic vane 53 is formed so as to be gradually thinner from its proximal portion 74, to which the rotor body 51 is continuously connected, to its other end 75 which is a free end.

The one side surface 42 in the axial direction A of the cover 21 is slidably in close contact with one end surface 81 in the axial direction A of the rotor 9 so as to be rotatable in the R1 and R2 directions. The one side surface 44 in the axial direction A of the cover 22 is slidably in close contact with the other end surface 82 in the axial direction A of the rotor 9 so as to be rotatable in the R1 and R2 directions.

Seal rings 85 for preventing the leakage of the viscous fluid 3 from the chambers 5 and 6 to outside the accommodating case 4 are respectively disposed between the side surface 42 of the cover 21 and each of the cylindrical body 35 and the rotor body 51 and between the side surface 44 of the cover 21 and each of the cylindrical body 35 and the rotor body 51.

Figure 5:
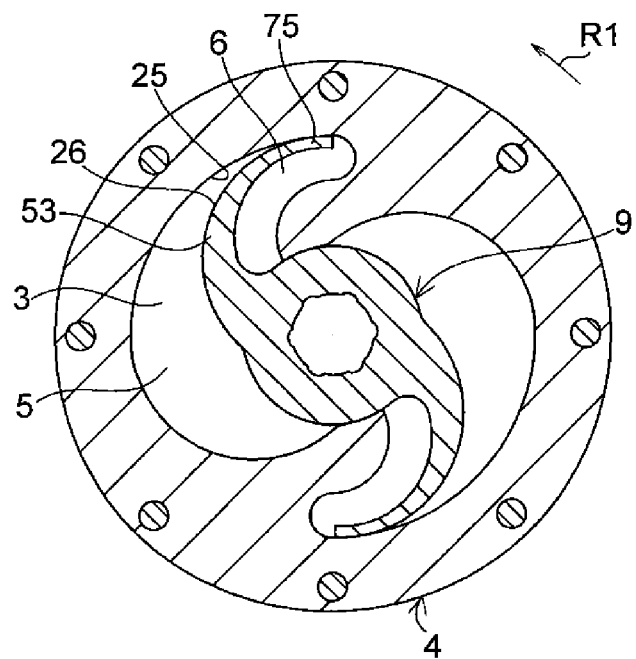
FIG. 5 is a diagram explaining the operation of the embodiment shown in FIG. 1.
Figure 6:
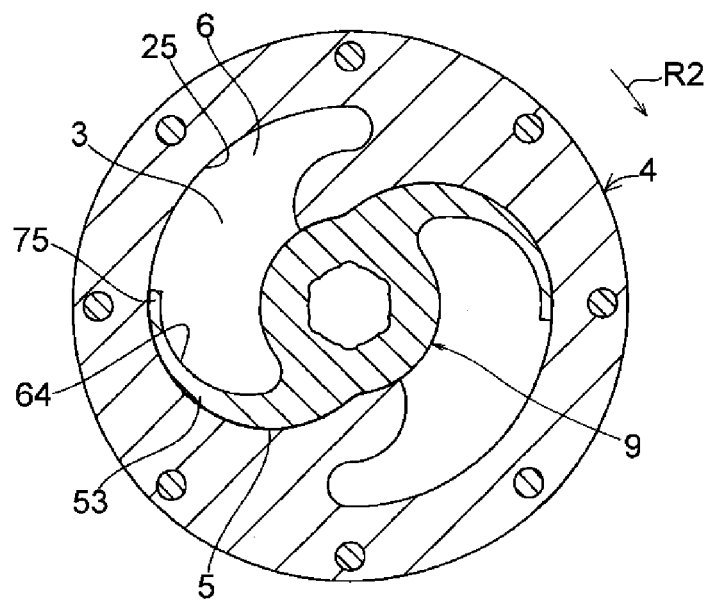
FIG. 6 is a diagram explaining the operation of the embodiment shown in FIG. 1.
Figure 7:
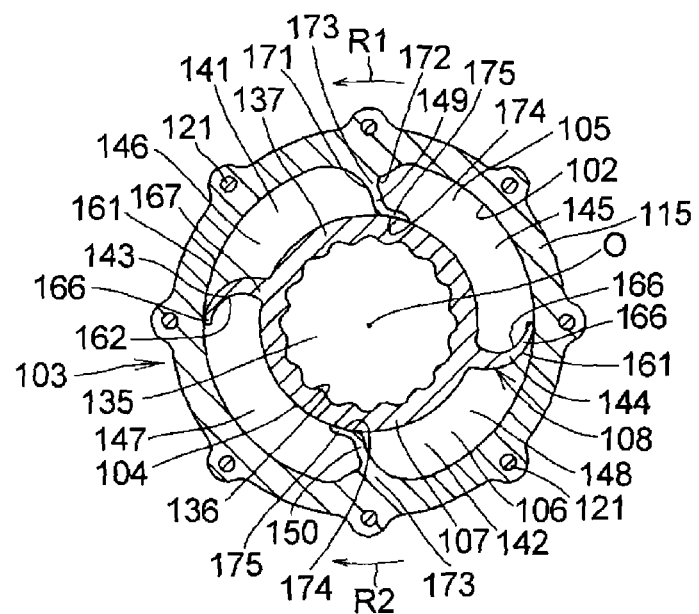
FIG. 7 is an explanatory cross-sectional view, taken in the direction of arrows along line VII-VII shown in FIG. 8, of another preferred embodiment of the present invention.
Figure 8:
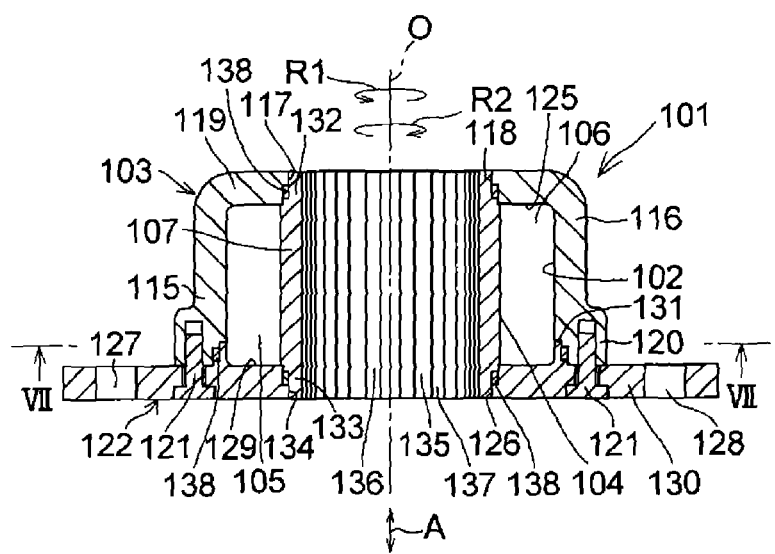
FIG. 8 is an explanatory cross-sectional view, taken in the direction of arrows along line VIII-VIII in FIG. 10, of the embodiment shown in FIG. 7.
Figure 9:
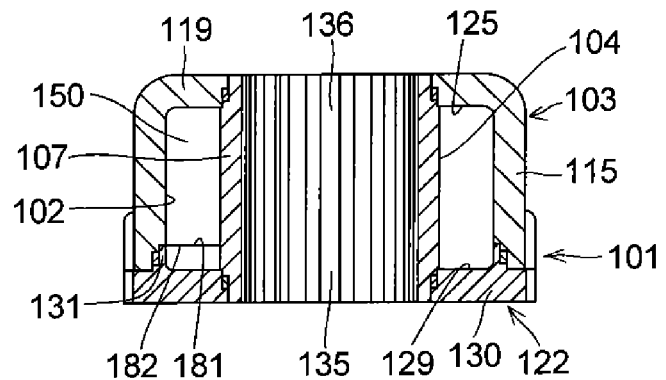
FIG. 9 is an explanatory cross-sectional view, taken in the direction of arrows along line IX-IX in FIG. 10, of the embodiment shown in FIG. 7.
Figure 10:
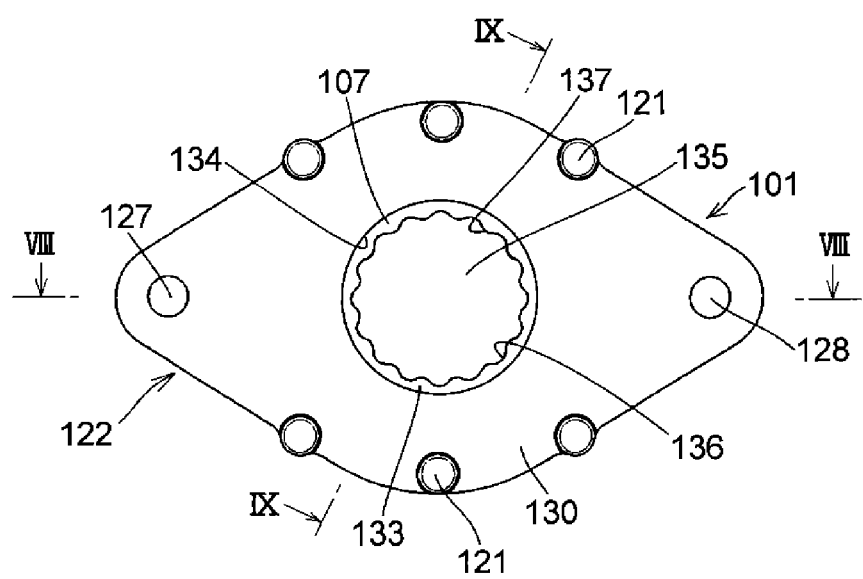
FIG. 10 is a front elevational view of the embodiment shown in FIG. 7.
Figure 11:
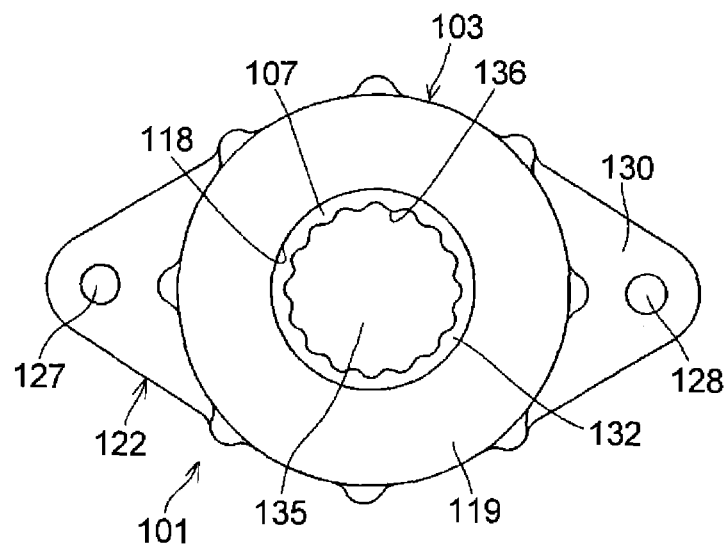
FIG. 11 is a rear view of the embodiment shown in FIG. 7.
Figure 12:
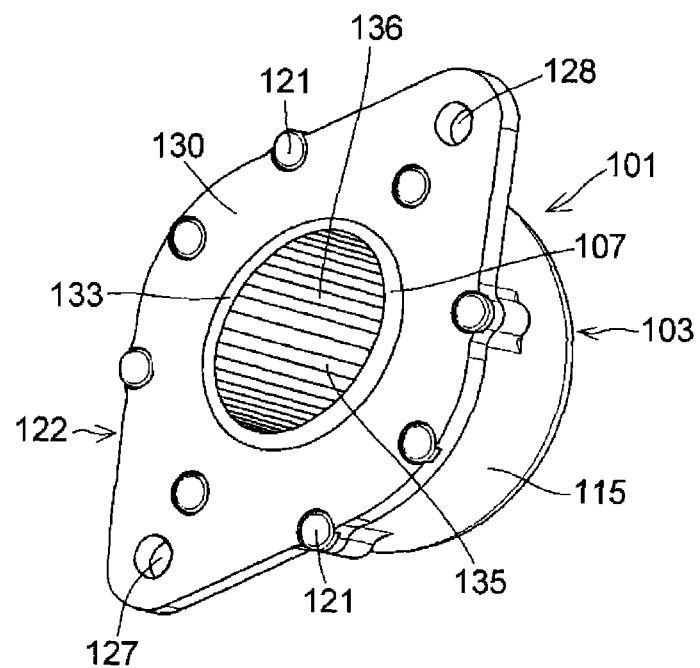
FIG. 12 is a perspective view of the embodiment shown in FIG. 7.
Figure 13:
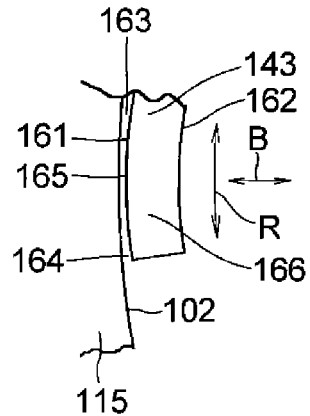
FIG. 13 is a partially enlarged explanatory view of the embodiment shown in FIG. 7.

With the above-described rotary damper 1, at the rotational position of the rotor 9 shown in FIG. 5, when the rotor 9 is rotated in the R1 direction with respect to the accommodating case 4 so as to reduce the one chamber 5 and enlarge the other chamber 6, the pressure of the viscous fluid 3 is imparted to the curved projecting surface 26 of the elastic vane 53, so that the elastic vane 53 is elastically deformed such that the other end 75 side of the elastic vane 53 moves away from the cylindrical inner peripheral surface 25 of the accommodating case 4 to widen the pair of wedge spaces 71 and 72. As a result, the viscous fluid 3 passes through the pair of widened wedge spaces 71 and 72 and flows from the one chamber 5 into the other chamber 6, thereby imparting to the rotation in the R1 direction of the rotor 9 small braking based on the flow resistance of the viscous fluid 3 passing through the pair of widened wedge spaces 71 and 72. Meanwhile, at the rotational position of the rotor 9 shown in FIG. 6, when the rotor 9 is rotated in the R2 direction with respect to the accommodating case 4 so as to enlarge the one chamber 5 and reduce the other chamber 6, the pressure of the viscous fluid 3 is imparted to the recessed surface 64 of the elastic vane 53, so that the elastic vane 53 is elastically deformed such that the other end 75 side of the elastic vane 53 approaches the cylindrical inner peripheral surface 25 of the accommodating case 4 to narrow the pair of wedge spaces 71 and 72. As a result, the viscous fluid 3 passes through the pair of narrowed wedge spaces 71 and 72 and flows from the other chamber 6 into the one chamber 5, thereby imparting to the rotation in the R2 direction of the rotor 9 large braking based on the flow resistance of the viscous fluid 3 passing through the pair of narrowed wedge spaces 71 and 72. Thus, the rotary damper 1 functions as a unidirectional damper.

In addition, with the rotary damper 1, the viscous fluid 3 whose viscosity declines with a temperature rise is adapted to pass through the pair of wedge spaces 71 and 72 in the rotation in the R1 and R2 directions of the rotor 9. Therefore, in a case where, for example, the viscous fluid 3 whose viscosity at low temperature has increased more than at normal temperature passes through the pair of wedge spaces 71 and 72, the elastic vane 53 is caused to undergo large elastic deformation such that the other end 75 side of the elastic vane 53 moves away from the cylindrical inner peripheral surface 25 of the accommodating case 4 more than at normal temperature owing to the increased pressure of the viscous fluid 3 at the pair of wedge spaces 71 and 72, so that the pair of wedge spaces 71 and 72 are largely widened as compared with the time of normal temperature. As a result, by virtue of an increase in the flow resistance based on the increased viscosity of the viscous fluid 3 itself and a decline in the flow resistance based on the widening of the pair of wedge spaces 71 and 72, it is possible to maintain the braking persisting during normal temperature despite the low temperature. Meanwhile, in a case where the viscous fluid 3 whose viscosity at high temperature has decreased more than at normal temperature passes through the pair of wedge spaces 71 and 72, the elastic vane 53 is caused to undergo small elastic deformation such that the other end 75 side of the elastic vane 53 approaches the cylindrical inner peripheral surface 25 of the accommodating case 4 more than at normal temperature owing to the decreased pressure of the viscous fluid 3 at the pair of wedge spaces 71 and 72, so that the pair of wedge spaces 71 and 72 are narrowed. As a result, by virtue of a decrease in the flow resistance based on the decreased viscosity of the viscous fluid 3 itself and an increase in the flow resistance based on the narrowing of the pair of wedge spaces 71 and 72, it is possible to maintain the braking persisting during normal temperature despite the high temperature. Hence, the braking which is generated is free of temperature dependence, and it is possible to obtain braking which does not change even at high temperature or low temperature.

The above-described operation is effected in the same way on the elastic vane 54 side as well.

The above-described rotary damper 1 has the pair of elastic vanes 53 and 54, however, the rotary damper in accordance with the present invention may have one or three or more elastic vanes in substitution of such a pair of elastic vanes.

A rotary damper 101 in accordance with another embodiment shown in FIGS. 7 to 13 is comprised of a synthetic resin-made accommodating case 103 having a cylindrical inner peripheral surface 102; a synthetic resin-made rotor 107 disposed in the interior of the accommodating case 103 relatively rotatably in the R1 and R2 directions about the axis O with respect to the accommodating case 103 so as to form a space 106 for accommodating between the inner peripheral surface 102 and a cylindrical outer peripheral surface 104 concentric with the inner peripheral surface 102 about the axis O a viscous fluid 105 which is constituted by silicone oil or the like and whose viscosity declines with a temperature rise; and a vane means 108 disposed in the space 106 so as to cause large flow resistance to be generated in the viscous fluid 105 in the relative rotation in one direction of the rotor 107 with respect to the accommodating case 103, i.e., in this embodiment in the rotation in the R1 direction of the rotor 107 with respect to the accommodating case 103, and so as to cause smaller flow resistance than that flow resistance to be generated therein in the relative rotation in the other opposite direction to the relative rotation in the one direction of the rotor 107 with respect to the accommodating case 103, i.e., in this embodiment in the rotation in the R2 direction of the rotor 107 with respect to the accommodating case 103.

The accommodating case 103 includes a cylinder potion 115 having the cylindrical inner peripheral surface 102; a collar portion 119 which is integrally formed radially inwardly on one annular end portion 116 in an A direction, i.e., an axial direction, of the cylinder portion 115, and which has an inner peripheral surface 118 defining a through hole 117; and a cover 122 secured to the other annular end portion 120 in the A direction of the cylinder portion 115 by means of a plurality of screws 121.

The collar portion 119 at its one side surface 125 in the A direction defines one side of the space 106 in the A direction. The cover 122 includes an oval plate-like portion 130 which has a through hole 126 formed in its center and a pair of through holes 127 and 128 respectively formed in its both end portions, and which at its side surface 129 in the A direction defines the other side of the space 106 in the A direction, as well as a cylindrical projection 131 which is integrally formed on the one side surface 129 of the plate-like portion 130.

The hollow rotor 107 at its annular end portions 132 and 133 in the axial direction A is supported by the inner peripheral surface 118 of the collar portion 119 of the accommodating case 103 and by an inner peripheral surface 134 of the plate-like portion defining the through hole 126, so as to be rotatable in the R1 and R2 directions. An inner peripheral surface 136 of the rotor 107, which defines a hollow portion 135, has serrations 137.

Seal rings 138 for preventing the leakage of the viscous fluid 105 from the space 106 to outside the accommodating case 103 are respectively disposed between the inner peripheral surface 118 of the collar portion 119 and the end portion 132 in the axial direction A of the rotor 107, between the end portion 120 of the cylinder portion 115 and the projection 131 fitted to the end portion 120, and between the inner peripheral surface 134 of the plate-like portion 130 and the end portion 133 in the axial direction A of the rotor 107.

The vane means 108 has a pair of elastic vanes 143 and 144 for partitioning into two chambers 141 and 142 the annular space 106 inside the accommodating case 103 accommodating the viscous fluid 105 between the cylindrical inner peripheral surface 102 of the accommodating case 103 and the cylindrical outer peripheral surface 104 of the rotor 107 concentric with the inner peripheral surface 102, as well as a pair of elastic vanes 149 and 150 serving as other vanes for further partitioning into two chambers at least one of the two chambers 141 and 142 partitioned by the pair of elastic vanes 143 and 144, i.e., in this embodiment partitioning the respective ones of the two chambers 141 and 142 into two chambers 145 and 146 and two chambers 147 and 148.

As for the elastic vanes 143 and 144 and the elastic vanes 149 and 150, since both the elastic vanes 143 and 144 and both the elastic vanes 149 and 150 are formed in a mutually similar manner with symmetrical shapes about the axis O, a detailed description will be given hereafter of the elastic vane 143 and the elastic vane 149. As for the elastic vane 144 and the elastic vane 150, a description and an illustration will be given by using the same reference numerals as those of the elastic vane 143 and the elastic vane 149.

The elastic vane 143 partitioning into the chamber 146 and the chamber 147 includes a curved projecting surface 161 which is continuously connected at its one end portion to the outer peripheral surface 104 of the rotor 107 and which is projecting in the R2 direction of the rotor 107 with respect to the accommodating case 103, as well as a curved recessed surface 162 which is continuously connected at its one end portion to the outer peripheral surface 104 of the rotor 107 in correspondence with the projecting surface 161, and which extends along the projecting surface 161 so as to gradually approach the projecting surface 161 from the one end portion to the other end portion of the projecting surface 161, and terminates at a terminating end of the projecting surface 161.

The projecting surface 161 has on its other end portion side a circular arc-shaped projecting surface 165 which forms between the same and the inner peripheral surface 102 of the cylinder portion 115 a pair of wedge spaces 163 and 164 opposing each other in the R1 and R2 directions, i.e., a rotational direction R of the relative rotation of the rotor 107 with respect to the accommodating case 103, and which has a smaller radius of curvature than the radius of curvature of the inner peripheral surface 102. The circular arc-shaped projecting surface 165 determines the width in the B direction, i.e., the radial direction, of the one wedge space 163 communicating with the chamber 146 such that the width in the radial direction of the one wedge space 163 becomes gradually narrow toward the other wedge space 164 in the rotational direction R. Also, the circular arc-shaped projecting surface 165 determines the width in the B direction of the other wedge space 164 communicating with the chamber 147 such that the width in the B direction of the other wedge space 164 becomes gradually narrow toward the one wedge space 163 in the rotational direction R. Thus, the viscous fluid 105 passing through the pair of wedge spaces 163 and 164 is adapted to determine the width in the B direction of the pair of wedge spaces 163 and 164 by means of its viscosity by elastically deflecting the elastic vane 143.

By virtue of the above-described projecting surface 161 and the recessed surface 162, the elastic vane 143 is formed such that its thickness in the R1 and R2 directions, i.e., in the circumferential direction R, decreases gradually from the outer peripheral surface 104 toward the inner peripheral surface 102, and becomes gradually thinner from its proximal portion 167 which is formed in a circular arc shape and is continuously connected to the rotor 107 to its free end portion 166 having the circular arc-shaped projecting surface 165.

In the rotation in the R1 direction of the rotor 107 with respect to the accommodating case 103, the viscous fluid 105 which passes through the pair of wedge spaces 163 and 164 flows from the other chamber 147 into the one chamber 146 by passing through the pair of narrowed wedge spaces 164 and 163, and is thus adapted to generate large flow resistance which is defined by the pair of narrowed wedge spaces 164 and 163 and resists that rotation in the R1 direction. Meanwhile, in the rotation in the R2 direction of the rotor 107 with respect to the accommodating case 103, the viscous fluid 105 flows from the one chamber 146 into the other chamber 147 by passing through the pair of widened wedge spaces 163 and 164, and is thus adapted to generate small flow resistance which is defined by the pair of widened wedge spaces 163 and 164 and resists that rotation in the R2 direction.

Also, the elastic vane 144 partitioning into the chamber 145 and the chamber 148 is formed in the same way as the elastic vane 143. The viscous fluid 105 passing through the pair of wedge spaces 163 and 164 in the elastic vane 144 is also adapted to determine the width in the B direction of the pair of wedge spaces 163 and 164 by means of its viscosity by elastically deflecting the elastic vane 144. In the rotation in the R1 direction of the rotor 107 with respect to the accommodating case 103, the viscous fluid 105 which passes through the pair of wedge spaces 163 and 164 in the elastic vane 144 flows from the other chamber 145 into the one chamber 148 by passing through the pair of narrowed wedge spaces 164 and 163, and is thus adapted to generate large flow resistance which is defined by the pair of narrowed wedge spaces 164 and 163 and resists that rotation in the R1 direction. Meanwhile, in the rotation in the R2 direction of the rotor 107 with respect to the accommodating case 103, the viscous fluid 105 flows from the one chamber 148 into the other chamber 145 by passing through the pair of widened wedge spaces 163 and 164, and is thus adapted to generate small flow resistance which is defined by the pair of widened wedge spaces 163 and 164 and resists that rotation in the R2 direction.

The elastic vane 149 partitioning the chamber 141 into the two chambers 145 and 146 contiguous in the rotational direction R in cooperation with the elastic vanes 143 and 144 includes a proximal portion 173 which has a circular arc-shaped recessed surface 171 complementary to the projecting surface 161 of the elastic vane 143 in such a manner as to oppose the projecting surface 161 of the elastic vane 143 in the rotational direction R and has a cross-sectionally V- or U-shaped recessed surface 172 in such a manner as to oppose the recessed surface 162 of the elastic vane 144 in the rotational direction R, as well as an elastically flexible tongue portion 175 which is integrally formed on the proximal portion 173 and opposes at its circular arc-shaped surface 174 the outer peripheral surface 104 of the rotor 107. A pair of wedge spaces similar to the pair of wedge spaces 163 and 164 are adapted to be formed between the outer peripheral surface 104 of the rotor 107 and the circular arc-shaped surface 174 of the tongue portion 175 having a larger radius of curvature than that of the outer peripheral surface 104. In the same way as the elastic vane 143, the elastic vane 149 forming the pair of wedge spaces similar to the pair of wedge spaces 163 and 164 at the circular arc-shaped surface 174 of the tongue portion 175 is adapted to allow the flow of the viscous fluid 105 from the chamber 145 into the chamber 146 through the pair of wedge spaces with large resistance in the relative rotation in the R1 direction of the rotor 107 with respect to the accommodating case 103, and is adapted to allow the flow of the viscous fluid 105 from the chamber 146 into the chamber 145 with small resistance in the relative rotation in the R2 direction of the rotor 107 with respect to the accommodating case 103.

Also, the elastic vane 150 partitioning the chamber 142 into the two chambers 147 and 148 contiguous in the rotational direction R in cooperation with the elastic vanes 143 and 144 is formed in the same way as the elastic vane 149. In the same way as the elastic vane 149, the elastic vane 150 forming the pair of wedge spaces between the outer peripheral surface 104 of the rotor 107 and the circular arc-shaped surface 174 of the tongue portion 175 is adapted to allow the flow of the viscous fluid 105 from the chamber 147 into the chamber 148 through the pair of wedge spaces with large resistance in the relative rotation in the R1 direction of the rotor 107 with respect to the accommodating case 103, and is adapted to allow the flow of the viscous fluid 105 from the chamber 148 into the chamber 147 with small resistance in the relative rotation in the R2 direction of the rotor 107 with respect to the accommodating case 103.

The one end surface in the A direction of each of the elastic vanes 143 and 144 is in close contact with the side surface 125 of the collar portion 119 slidingly movably in the R1 and R2 directions. Also, the other end surface in the A direction of each of the elastic vanes 143 and 144 is in close contact with the side surface 129 of the plate-like portion 130 slidingly movably in the R1 and R2 directions. The portion of each of the elastic vanes 149 and 150 whose proximal portion 173 is integrally formed on the inner peripheral surface 102 of the cylinder potion 115 is at its one end surface in the A direction in close contact with the side surface 125 of the collar portion 119 slidingly movably. Meanwhile, the portion of each of the elastic vanes 149 and 150 whose proximal portion 173 is integrally formed on the inner peripheral surface of the projection 131 is at its one end surface 181 in the A direction liquid-tightly in close contact with the other end surface 182 in the A direction of the portion of the respective one of the elastic vanes 149 and 150 whose proximal portion 173 is integrally formed on the inner peripheral surface 102 of the cylinder portion 115, and is at its other end surface in the A direction in close contact with the side surface 129 of the plate-like portion 130 slidingly movably.

Figure 14:
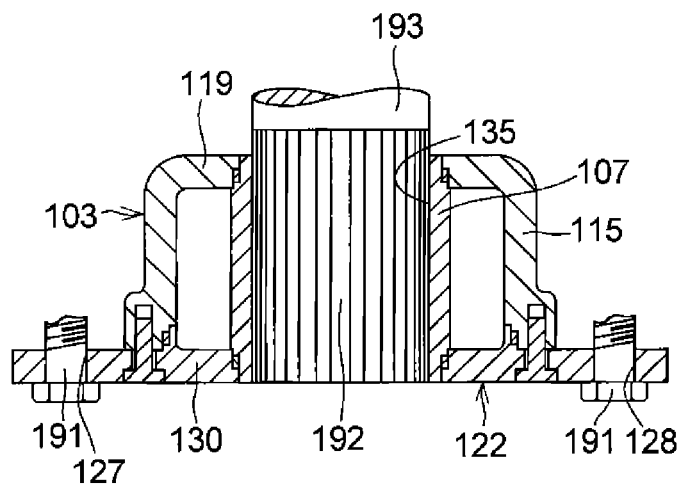
FIG. 14 is an explanatory view in which a rotating shaft is fitted in the embodiment shown in FIG. 7.
Figure 15:
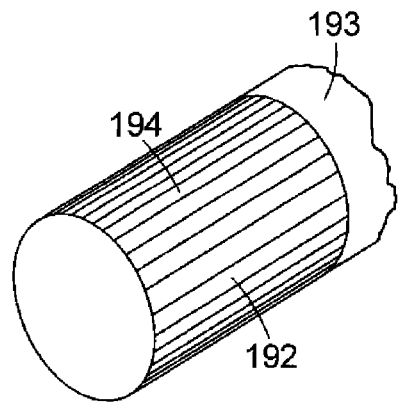
FIG. 15 is a perspective view of the rotating shaft shown in FIG. 14.
Figure 16:
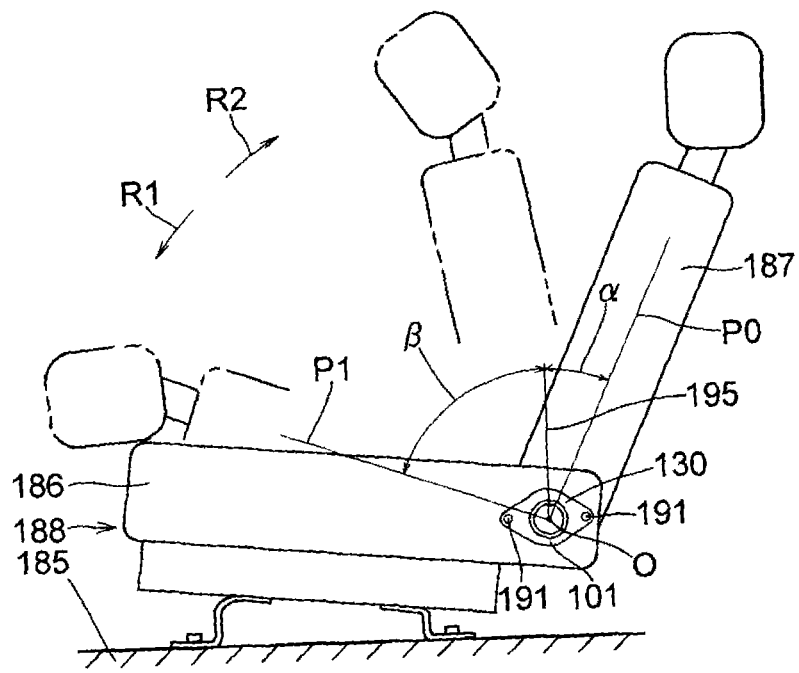
FIG. 16 is an explanatory diagram of an example in which the embodiment shown in FIG. 7 is installed in a vehicle seat.

As shown in FIGS. 14 to 16, the above-described rotary damper 101 is used, for example, as a braking mechanism for the rotation of a backrest portion 187 in the R1 and R2 directions with respect to a seat portion 186 in a vehicle seat 188 equipped with the seat portion 186 mounted fixedly on a vehicle body 185 and the backrest portion 187 mounted by being coupled to the seat portion 186 rotatably in the R1 and R2 directions about the axis O. The rotary damper 101 in this case is used by securing the plate-like portion 130 of the cover 122 and, hence, the accommodating case 103 to one of the seat portion 186 and the backrest portion 187, i.e., in this embodiment the seat portion 186, by means of screws 191 inserted in the through holes 127 and 128, and by coupling the rotor 107 to the other one of the seat portion 186 and the backrest portion 187, i.e., in this embodiment the backrest portion 187, by means of a rotating shaft 193 whose one end portion 192 is inserted in the hollow portion 135 of the rotor 107. The rotating shaft 193 with its other end secured to the backrest portion 187 is coupled to the rotor 107 as serrations 194 provided on the one end portion 192 are fitted to the serrations 137 of the rotor 107. Hence, in the rotation in the R1 and R2 directions of the rotating shaft 193 and, hence, in the rotation in the R1 and R2 directions of the backrest portion 187, the rotor 107, which is coupled to the backrest portion 187 by means of the rotating shaft 193, more particularly by means of the serrations 137 and the serrations 194 of the rotating shaft 193 fitted to the serrations 137, is adapted to be rotated in the same direction. Thus, the rotor 107 is coupled and fixed to the backrest portion 187.

In the vehicle seat 188 equipped with the seat portion 186 mounted on the vehicle body 185 of the automobile and the backrest portion 187 coupled rotatably to the seat portion 186, the backrest portion 187 is coupled to the seat portion 186 rotatably in the R1 and R2 directions about the axis O from an initial rotational position P0 at which the backrest portion 187 is inclined backward by a predetermined angle α, e.g., α=25°, with respect to a vertical plane 195 perpendicular to the front-back direction to a folded rotational position P1 at which the backrest portion 187 is inclined forward by a predetermined angle β, e.g., β=90°, with respect to the vertical plane 195. At the initial rotational position P0, the backrest portion 187 is inhibited from rotating in the R1 and R2 directions by an unillustrated unlockable lock mechanism. As the lock mechanism is unlocked, from the initial rotational position P0 to the folded rotational position P1, the backrest portion 187 is adapted to be rotated in the R1 direction in opposition to the relatively large flow resistance of the viscous fluid 105 which passes through the pairs of wedge spaces including the pairs of wedge spaces 163 and 164 due to the elastic vanes 143 and 144 as well as 149 and 150. Meanwhile, from the folded rotational position P1 to the initial rotational position P0, the backrest portion 187 is adapted to be rotated in the R2 direction by manual rotation in opposition to the relatively small flow resistance of the viscous fluid 105 which passes through the pairs of wedge spaces including the wedge spaces 163 and 164.

Figure 17:
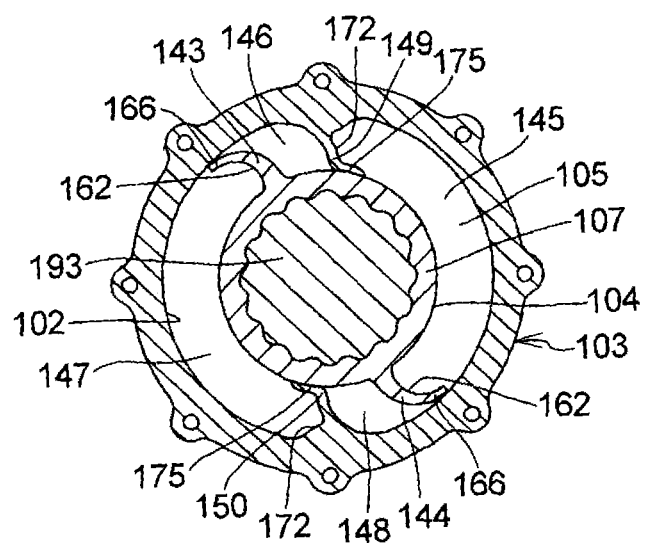
FIG. 17 is a diagram explaining the operation of the embodiment shown in FIG. 7.
Figure 18:
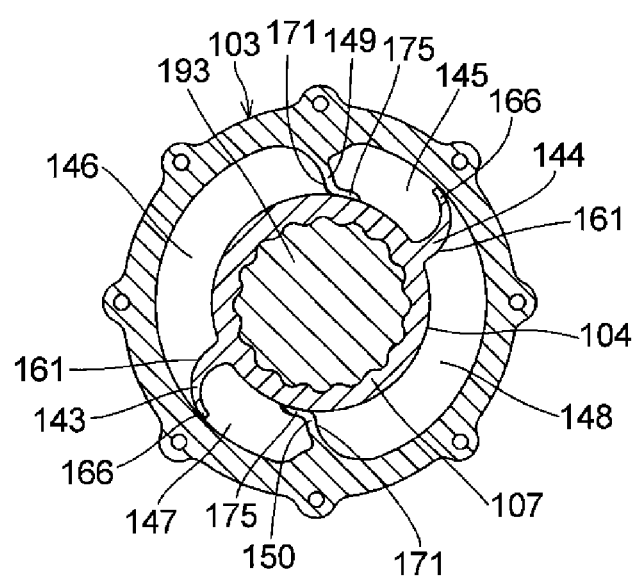
FIG. 18 is a diagram explaining the operation of the embodiment shown in FIG. 7.

With the above-described rotary damper 101 which functions as such a unidirectional rotary damper, when, upon unlocking of the lock mechanism at the rotational position (corresponding to the initial rotational position P0) of the rotor 107 shown in FIG. 17, the backrest portion 187 is rotated in the R1 direction, and the rotor 107 is rotated in the R1 direction with respect to the accommodating case 103 so as to reduce the chambers 145 and 147 and enlarge the chambers 146 and 148, the pressure of the viscous fluid 105 is imparted to the recessed surfaces 162 of the elastic vanes 143 and 144 and the recessed surfaces 172 of the elastic vanes 149 and 150. Therefore, the free end portion 166 side, i.e., the other end portion side, of each of the elastic vanes 143 and 144 approaches the inner peripheral surface 102 of the accommodating case 103, and the tongue portion 175 side of each of the elastic vanes 149 and 150 approaches the outer peripheral surface 104 of the rotor 107, so that the elastic vanes 143 and 144 and the elastic vanes 149 and 150 are elastically deformed so as to reduce the pairs of wedge spaces including the pairs of wedge spaces 163 and 164. As a result, the viscous fluid 105 flows from each of the chambers 145 and 147 into each of the chambers 148 and 146 and into each of the chambers 146 and 148 by passing through the pairs of wedge spaces including the pairs of narrowed wedge spaces 163 and 164. Thus, large braking due to the relatively large flow resistance of the viscous fluid 105 passing through the pairs of wedge spaces including these narrowed wedge spaces 163 and 164 is imparted to the rotation in the R1 direction of the rotor 107, to thereby rotate the backrest portion 187 slowly in the same direction up to the folded rotational position P1. Meanwhile, when, at the rotational position (corresponding to the folded rotational position P1) of the rotor 107 shown in FIG. 18, the backrest portion 187 is manually rotated in the R2 direction, and the rotor 107 is rotated in the R2 direction with respect to the accommodating case 103 so as to enlarge the chambers 145 and 147 and reduce the chambers 146 and 148, the pressure of the viscous fluid 105 is imparted to the respective curved projecting surfaces 161 of the elastic vanes 143 and 144 and the recessed surfaces 171 of the elastic vanes 149 and 150. Therefore, the free end portion 166 side of each of the elastic vanes 143 and 144 moves away from the inner peripheral surface 102 of the accommodating case 103, and the tongue portion 175 of each of the elastic vanes 149 and 150 moves away from the outer peripheral surface 104 of the rotor 107, so that the elastic vanes 143 and 144 and the elastic vanes 149 and 150 are elastically deformed so as to widen the pairs of wedge spaces including the pairs of wedge spaces 163 and 164. As a result, the viscous fluid 105 flows from each of the chambers 146 and 148 into each of the chambers 147 and 145 and into each of the chambers 145 and 147 by passing through the pairs of wedge spaces including the pairs of widened wedge spaces 163 and 164. Thus, small braking due to the relatively small flow resistance of the viscous fluid 105 passing through the pairs of wedge spaces including these widened wedge spaces 163 and 164 is imparted to the rotation in the R2 direction of the rotor 107, so that the backrest portion 187 is adapted to be rotated up to the initial rotational position P0 by a small manual force.

According to such a rotary damper 101, when the backrest portion 187 is rotated from the initial rotational position P0 to the folded rotational position P1, large flow resistance can be generated in the viscous fluid 105 by the vane means 108. As a result, appropriate resistance can be imparted to the rotation of the backrest portion 187 in the direction toward the folded rotational position P1 to make it possible to avoid the collision of the backrest portion 187 at the folded rotational position P1, and the backrest portion 187 can be easily rotated manually from the folded rotational position P1 to the initial rotational position P0.

In addition, with the rotary damper 101 functioning as a unidirectional damper, the viscous fluid 105 whose viscosity declines with a temperature rise is adapted to pass through the pairs of wedge spaces including the pairs of wedge spaces 163 and 164 in the rotation in the R1 and R2 directions of the rotor 107. Therefore, in a case where, for example, the viscous fluid 105 whose viscosity at low temperature has increased more than at normal temperature passes through the wedge spaces 163 and 164, the elastic vane 143 is caused to undergo large elastic deformation such that the free end portion 166 side of the elastic vane 143 moves away from the inner peripheral surface 102 of the accommodating case 103 more than at normal temperature owing to the increased pressure of the viscous fluid 105 at the wedge spaces 163 and 164, so that the wedge spaces 163 and 164 are largely widened as compared with the time of normal temperature. As a result, by virtue of an increase in the flow resistance based on the increased viscosity of the viscous fluid 105 itself and a decline in the flow resistance based on the widening of the wedge spaces 163 and 164, it is possible to maintain the braking persisting during normal temperature despite the low temperature. Meanwhile, in a case where the viscous fluid 105 whose viscosity at high temperature has decreased more than at normal temperature passes through the wedge spaces 163 and 164, the elastic vane 143 is caused to undergo small elastic deformation such that the free end portion 166 side of the elastic vane 143 approaches the inner peripheral surface 102 of the accommodating case 103 more than at normal temperature owing to the decreased pressure of the viscous fluid at the wedge spaces 163 and 164, so that the wedge spaces 163 and 164 are narrowed. As a result, by virtue of a decrease in the flow resistance based on the decreased viscosity of the viscous fluid 105 itself and an increase in the flow resistance based on the narrowing of the wedge spaces 163 and 164, it is possible to maintain the braking persisting during normal temperature despite the high temperature. Hence, the braking which is generated is free of temperature dependence, and it is possible to obtain braking which does not change even at high temperature or low temperature. In consequence, the backrest portion 187 can be reliably rotated to the folded positional position P1, and can be rotated to be returned to the initial rotational position P0 with a fixed small manual force.

Although the vane means 108 of the above-described rotary damper 101 has two pairs of elastic vanes 143 and 144 as well as 149 and 150, the rotary damper in accordance with the invention may have one pair of elastic vanes 143 and 144 and the elastic vane 149 or 150, or may have three or more pairs of elastic vanes. Further, although the rotary damper 101 is arranged to form a pair of wedge spaces between the circular arc-shaped surface 174 of the tongue portion 175 of each of the elastic vanes 149 and 150 and the outer peripheral surface 104 of the rotor 107, the rotary damper 101 may be arranged such that the pair of wedge spaces are not formed by causing the circular arc-shaped surface 174 of the tongue portion 175 of each of the elastic vanes 149 and 150 and the outer peripheral surface 104 of the rotor 107 to be brought into tight frictional contact with each other slidably in the R1 and R2 directions.

DESCRIPTION OF REFERENCE NUMERALS AND SIGNS

1: rotary damper
2: interior

3: viscous fluid
4: accommodating case
5, 6: chamber
9: rotor

The invention claimed is:

1. A rotary damper comprising: an accommodating case having a cylindrical inner peripheral surface; a rotor disposed in an interior of said accommodating case relatively rotatably with respect to said accommodating case so as to form a space for accommodating between the cylindrical inner peripheral surface of said accommodating case and a cylindrical outer peripheral surface concentric with that inner peripheral surface a viscous fluid whose viscosity declines with a temperature rise; and vane structure disposed in the space accommodating the viscous fluid between the cylindrical inner peripheral surface of said accommodating case and the cylindrical outer peripheral surface of said rotor so as to cause large flow resistance to be generated in the viscous fluid in the relative rotation in a first rotational direction of said rotor with respect to said accommodating case and so as to cause smaller flow resistance than that flow resistance to be generated therein in the relative rotation in a second rotational direction opposite to the relative rotation in the first rotational direction, wherein said vane structure has a pair of elastic vanes for partitioning into two chambers the space accommodating the viscous fluid between the cylindrical inner peripheral surface of said accommodating case and the cylindrical outer peripheral surface of said rotor and another elastic vane for further partitioning into two chambers at least one of the two chambers partitioned by the pair of elastic vanes, wherein each of the pair of elastic vanes includes a curved projecting surface which is continuously connected at one end portion of the curved projecting surface to the outer peripheral surface of said rotor and which is projecting in the second opposite rotational direction, and a curved recessed surface which is continuously connected at one end portion of the curved recessed surface to the outer peripheral surface of said rotor in correspondence with the projecting surface, and which extends along the projecting surface, wherein the projecting surface has on another end portion side of the projecting surface a circular arc-shaped projecting surface which forms between the circular arc-shaped projecting surface and the inner peripheral surface of said accommodating case a pair of wedge spaces opposing each other in the first and second rotational directions, the circular arc-shaped projecting surface determines a radial width of one of the wedge spaces communicating with one of the two chambers adjacent to each other with the circular arc-shaped projecting surface therebetween in the first and second rotational directions, such that the radial width of the one wedge space becomes gradually narrow toward another one of the wedge spaces communicating with another one of the chambers adjacent to each other with the circular arc-shaped projecting surface therebetween in the first and second rotational directions, and the circular arc-shaped projecting surface determines a radial width of the other wedge space communicating with the other one of the two chambers adjacent to each other with the circular arc-shaped projecting surface therebetween in the first and second rotational directions, such that the radial width of the other wedge space becomes gradually narrow toward the one wedge space communicating with the one of the two chambers adjacent to each other with the circular arc-shaped projecting surface therebetween in the first and second rotational directions, the viscous fluid passing through the pair of wedge spaces is adapted to determine the radial width of the pair of wedge spaces by means of a viscosity of the viscous fluid by elastically deflecting each of the pair of elastic vanes, wherein the other elastic vane includes a proximal portion which is united with the inner peripheral surface of said accommodating case and which has a circular arc-shaped recessed surface complementary to the projecting surface of at least one of the pair of elastic vanes in such a manner as to oppose the projecting surface of at least one of the pair of elastic vanes in the second rotational direction and an elastically flexible tongue portion which is integrally formed on the proximal portion and has a circular arc-shaped surface opposing the outer peripheral surface of said rotor, and wherein the projecting surface of at least one of the pair of elastic vanes is adapted to be capable of coming into contact with said circular arc-shaped recessed surface in the second rotational direction.

2. The rotary damper according to claim 1, wherein the circular arc-shaped projecting surface has a smaller radius of curvature than a radius of curvature of the inner peripheral surface of said accommodating case.

3. The rotary damper according to claim 1, wherein the recessed surface extends along the projecting surface so as to gradually approach the projecting surface from the one end portion to the other end portion of the projecting surface.

4. A rotary damper comprising: an accommodating case having a cylindrical inner peripheral surface; a rotor disposed in an interior of said accommodating case relatively rotatably with respect to said accommodating case so as to form a space for accommodating a viscous fluid; and vane structure disposed in the space accommodating the viscous fluid between the cylindrical inner peripheral surface of said accommodating case and a cylindrical outer peripheral surface of said rotor so as to cause large flow resistance to be generated in the viscous fluid in the relative rotation in a first rotational direction of said rotor with respect to said accommodating case and so as to cause smaller flow resistance than that flow resistance to be generated therein in the relative rotation in a second rotational direction opposite to the relative rotation in the first rotational direction, wherein said vane structure has a pair of elastic vanes for partitioning into two chambers the space accommodating the viscous fluid between the cylindrical inner peripheral surface of said accommodating case and the cylindrical outer peripheral surface of said rotor and another elastic vane for further partitioning into two chambers at least one of the two chambers partitioned by the pair of elastic vanes, wherein each of the pair of elastic vanes includes a curved projecting surface which is continuously connected at one end portion of the curved projecting surface to the outer peripheral surface of said rotor and which is projecting in the second rotational direction, wherein the projecting surface has on another end portion side of the projecting surface a circular arc-shaped projecting surface which forms between the circular arc-shaped projecting surface and the inner peripheral surface of said accommodating case a pair of wedge spaces opposing each other in the first and second rotational directions, wherein the other elastic vane includes a proximal portion which is integrally formed on the inner peripheral surface of said accommodating case and which has a circular arc-shaped recessed surface complementary to the projecting surface of at least one of the pair of elastic vanes in such a manner as to oppose the projecting surface of at least one of the pair of elastic vanes in the second rotational direction and an elastically flexible tongue portion which is integrally formed on the proximal portion and has a circular arc-shaped surface opposing the outer peripheral surface of said rotor, and wherein the projecting surface of at least one of the pair of elastic vanes is adapted to be capable of coming into contact with said circular arc-shaped recessed surface in the second rotational direction.

\* \* \* \* \*